United States Patent Office 2,891,086
Patented June 16, 1959

2,891,086

PROCESS FOR PRODUCTION OF TRIMETHOXYBOROXINE

William H. Schechter, Zelienople, Pa., assignor, by mesne assignments, to Callery Chemical Company, Pittsburgh, Pa., a corporation of Pennsylvania No Drawing. Application May 16, 1955
Serial No. 508,797

5 Claims. (Cl. 260—462)

This invention relates to a process for the production of trimethoxyboroxine, $B_3O_3(OCH_3)_3$, and more particularly it relates to a new and useful process whereby trimethyl borate, mixtures of trimethyl borate and methanol or trimethyl borate-methanol azeotrope are hydrolyzed in hexane to form a methanol-hexane azeotrope which is removed by distillation leaving a residue of trimethoxyboroxine.

Goubeau and Keller prepared trimethoxyboroxine in 1951 by heating equimolar quantities of boric oxide and trimethyl borate in a closed bomb. Another method involves the hydrolysis of trimethyl borate which necessitates the recycle of considerable boron in the form of the trimethyl borate-methanol azeotrope. Both of these methods require the use of pure trimethyl borate which is relatively expensive. A more recently discovered method of preparation is the reaction of boric oxide with trimethyl borate-methanol azeotrope. This latter method is not completely satisfactory because the metaboric acid formed dissolves in the trimethoxyboroxine and requires further separation to obtain a pure product. A more desirable method of preparation would be one in which all the boron values are recovered as trimethoxyboroxine.

The term trimethoxyboroxine as used herein refers to the compound or composition of matter having the empirical formula, $B_3O_6C_3H_9$ since there is some difference among various investigators as to whether this material is a compound or a solution of boric oxide in trimethyl borate. Trimethoxyboroxine is of value as an intermediate in the preparation of dimethoxyborane, $$HB(OCH_3)_2$$

and diborane, $B_2H_6$.

It is an object of this invention to provide a new and useful process for producing trimethoxyboroxine by the hydrolysis of trimethyl borate, mixtures of trimethyl borate and methanol or trimethyl borate-methanol azeotrope in hexane and distilling off the methanol-hexane azeotrope.

Another object is to provide a simple and economical process for preparing trimethoxyboroxine in which all the boron values are recovered as trimethoxyboroxine thus avoiding the necessity of recycling the trimethylborate-methanol azeotrope.

Other objects will become apparent throughout the specification and claims which follow.

This new and improved process for preparing trimethoxyboroxine will be more fully described hereinafter and the novelty thereof will be particularly pointed out and distinctly claimed.

This invention is based upon the discovery that trimethoxyboroxine can be prepared by hydrolyzing trimethyl borate, mixtures of trimethyl borate and methanol or trimethyl borate-methanol azeotrope in hexane, suitably a stoichiometric excess of hexane, so that all the boron is recovered in the main product leaving a methanol-hexane azeotrope which can be readily separated.

The chemical reactions involved can be illustrated as follows:

$3B(OCH_3)_3 + 3H_2O + xC_6H_{14} \rightarrow$
$\qquad B_3O_3(OCH_3)_3 + 6CH_3OH \cdot C_6H_{14}$ azeotrope $3B(OCH_3)_3 \cdot CH_3OH + 3H_2O + xC_6H_{14} \rightarrow$
$\qquad B_3O_3(OCH_3)_3 + 9CH_3OH \cdot C_6H_{14}$ azeotrope In carrying out these reactions the isomeric hexane known as 2,3 dimethyl butane is preferred since it azeotropes preferentially with methanol whereas normal hexane forms binary azeotropes with methanol and trimethyl borate. However, hexane mixtures can be used if desired without serious loss of boron values.

In one experiment, a 200 ml. one-necked flask was charged with 114 ml. of trimethyl borate and 17 ml. of water. The flask was attached to a 20 plate distillation column packed with glass helices. The contents of the flask were refluxed while 420 ml. of 2,4 dimethyl butane were added in increments of 60 ml. over a 6 hour period. The methanol-hexane azeotrope was recovered from the top of the column at a head temperature of 45°–58° C. The liquid which remained in the flask was then distilled through a one plate column until the head temperature reached 67° C. and the pot temperature was 143° C. In this manner the final traces of hexane were removed from the trimethoxyboroxine. The volume of liquid after filtering was 38 ml. which represents a yield of 80% based on the trimethyl borate used. Analysis showed a boron content of 17.9 milligram atoms per gram, compared to the theoretical of 17.3 milligram atoms of boron per gram. The density was 1.25 g./ml. at 25° C.

In another experiment, a 200 ml. one-necked flask was charged with 154 ml. of trimethyl borate-methanol azeotrope (B.P.–50° C.) and 17 ml. of water. The flask was attached to a 20 plate distillation column packed with glass helices and the contents refluxed. Within a 12 hour period, 480 ml. of a mixture of isomeric hexanes were added in increments of 60 ml. A total of 410 ml. of methanol-hexane azeotrope was recovered at the top of the column at a head temperature of 45°–58° C. The final traces of isomeric hexanes were removed by adding 35 ml. of trimethyl borate to the liquid which remained in the flask and distilling through a one plate column until the pot temperature reached 143° C. A total of 37 ml. of trimethoxyboroxine was obtained which is a yield of 80% based on the trimethyl borate used. Analysis showed a boron content of 17.3 milligram atoms per gram and a density of 1.24 g./ml. at 25° C.

In other experiments it was found that mixtures of trimethyl borate and methanol were also satisfactory in this reaction if sufficient hexane was used to form the methanol-hexane azeotrope.

Having thus described the principles and best mode of operating this invention as required by the patent statutes, it should be understood that within the scope of the appended claims this invention may be practiced otherwise than as specifically described.

What is desired to be claimed and secured by United States Patent is:

1. A process for producing trimethoxyboroxine which comprises hydrolyzing trimethyl borate in an amount of hexane sufficient to form an azeotrope with resulting methanol to form a mixture of trimethoxyboroxine and methanol-hexane azeotrope, distilling said mixture to remove methanol-hexane azeotrope therefrom and recovering the trimethoxyboroxine.

2. A process according to claim 1 in which a stoichiometric excess of hexane is used.

3. A method according to claim 1 in which the trimethyl borate is present as a mixture with methanol.

4. A process according to claim 3 in which the trimethyl borate is in the form of the trimethyl borate-methanol azeotrope.

5. A method according to claim 1 in which the hexane used is 2,3 dimethyl butane.

References Cited in the file of this patent

Scattergood et al.: J. Amer. Chem. Soc. 67, pp. 2150–52 (1945).

Goubeau et al.: Z. Anorg. U. Allgem. Chem. 267, pp. 1–26. (1951).